US007428753B2

(12) United States Patent
Engle et al.

(10) Patent No.: US 7,428,753 B2
(45) Date of Patent: Sep. 23, 2008

(54) SYSTEM AND METHOD FOR SECURE NETWORK CONNECTIVITY

(75) Inventors: Michael T. Engle, Union City, NJ (US); Frederick Nwokobia, Union, NJ (US); Bradley D. Noack, Hoboken, NJ (US); Jerzy Makowiecki, Whitehouse Station, NJ (US)

(73) Assignee: Lehman Brothers Inc., New York, NY (US)

( * ) Notice: Subject to any disclaimer, the term of this patent is extended or adjusted under 35 U.S.C. 154(b) by 9 days.

(21) Appl. No.: 11/516,931

(22) Filed: Sep. 6, 2006

(65) Prior Publication Data

US 2007/0107061 A1 May 10, 2007

Related U.S. Application Data

(62) Division of application No. 10/903,941, filed on Jul. 30, 2004.

(51) Int. Cl.
*G06F 17/00* (2006.01)
(52) U.S. Cl. .................... 726/12; 726/15; 709/219
(58) Field of Classification Search ............ 726/1, 726/2, 9
See application file for complete search history.

(56) References Cited

U.S. PATENT DOCUMENTS

| | | | |
|---|---|---|---|
| 6,317,838 B1 * | 11/2001 | Baize ...................... 726/11 |
| 6,453,362 B1 * | 9/2002 | Bittinger et al. ............. 719/316 |
| 6,587,867 B1 | 7/2003 | Miller | |
| 7,231,661 B1 | 6/2007 | Villavicencio et al. | |
| 2001/0027527 A1 * | 10/2001 | Khidekel et al. ............ 713/201 |
| 2002/0049825 A1 | 4/2002 | Jewett et al. | |
| 2002/0144144 A1 * | 10/2002 | Weiss et al. ................. 713/201 |
| 2002/0184217 A1 * | 12/2002 | Bisbee et al. .................. 707/9 |
| 2004/0167984 A1 * | 8/2004 | Herrmann ................... 709/229 |
| 2005/0080897 A1 | 4/2005 | Braun | |

* cited by examiner

*Primary Examiner*—Gilberto Barron, Jr.
*Assistant Examiner*—Samson Lemma
(74) *Attorney, Agent, or Firm*—Morgan, Lewis and Bockius LLP

(57) ABSTRACT

A system and method to ensure that a remote computer making a VPN connection complies with network security policies. Server driven security checks may be configured to verify compliance with each access level before access is granted at that level. The security checks may be selected based at least according to the information received from the remote computer. After the server determines that the remote computer complies with the security policy for the requested access level, the server may pass a token to the remote computer, or may grant VPN access to the remote computer. If the remote computer does not comply with the security policy associated with the requested access level but is in compliance with a security policy corresponding to a lower access level, the server may grant the remote computer access to the lower access level.

41 Claims, 7 Drawing Sheets

[Registry keys]
- HKLM\SOFTWARE\Classes\BonziBDY.Document=shell
- HKLM\SOFTWARE\Classes\daffile=shell
- HKLM\SOFTWARE\Classes\AIM=shell
- HKLM\SOFTWARE=Gator.com
- HKLM\SOFTWARE=Brilliant Digital Entertainment
- HKLM\SOFTWARE=Kazaa
- HKLM\SOFTWARE=CommonName
- HKLM\SOFTWARE=Cydoor
- HKLM\SOFTWARE=BearShare
- HKLM\SOFTWARE=WhenU
- HKLM\SOFTWARE=NeoModus
- HKLM\SOFTWARE=rdxr
- HKLM\SOFTWARE=Distributed Computing Technologies, Inc.
- HKLM\SOFTWARE=Qtrax
- HKLM\SOFTWARE=iMesh
- HKLM\SOFTWARE=GoToMyPC

[Registry values or data]
- HKLM\SOFTWARE\Microsoft\Windows\CurrentVersion\Uninstall\Audiogalaxy Satellite=UninstallString
- HKLM\SOFTWARE\Microsoft\Windows\CurrentVersion\Run=XupiterStartup
- HKLM\SOFTWARE\Microsoft\Windows\CurrentVersion\Run=SQUpdatesChecker
- HKLM\SOFTWARE\Microsoft\Windows\CurrentVersion\Uninstall\{E499428A-E04F-4683-8A21-42A5E6D1C651}=UninstallString
- HKLM\SOFTWARE\Microsoft\Windows\CurrentVersion\Uninstall\Trillian=UninstallString;
- HKLM\SOFTWARE\Microsoft\WindowsNT\CurrentVersion\Winlogon\AllowMultipleTSSessions=0

[Prohibited files]
- %ProgramFiles%\Gator.com\*.*=
- %ProgramFiles%\PrecisionTime\*.*=

Fig. 6

| Step | Message |
|---|---|
| Connect | Started |
| Connecting... | http://lbsecapp01.lehman.com/lvp/vpnprofile.dll |
| Collecting... | VPN compliance information |
| Sending... | VPN compliance information |
| Receiving... | VPN profile data |
| Collecting... | VPN compliance information |
| Sending... | VPN compliance information |
| Receiving... | VPN profile data |
| Collecting... | VPN compliance information |
| Sending... | VPN compliance information |
| Receiving... | VPN profile data |
| Receive | Received profile: access level-1, location=nyc |
| Connecting VPN | Preparing to connect... |
| Connecting VPN | Making the connection... |
| Connecting VPN | Configuring the connection... |
| Connecting VPN | Connected |

Fig. 7

SYSTEM AND METHOD FOR SECURE NETWORK CONNECTIVITY

CROSS REFERENCE TO RELATED APPLICATIONS

This application is a divisional application of U.S. patent application Ser. No. 10/903,941, filed Jul. 30, 2004. The entire contents of the above-referenced application are incorporated herein by reference.

BACKGROUND OF THE INVENTION

Many companies allow users to access internal corporate networks and resources externally. One such method uses a Virtual Private Network (VPN) connection. In a typical scenario, a user working on a remote computer connects to the Internet and initiates a client side VPN program. The VPN program uses an acceptable networking protocol to access a company's VPN gateway computer. The gateway computer, e.g., a VPN server, authenticates the user and establishes a remote networking session for the remote user. One benefit of such a VPN session is that the remote user's computer appears to be directly to the company's network.

Internal corporate networks are usually buffered or isolated from the external network or Internet, for security reasons. Internet traffic into, and out of, the Internal network may be filtered based on the corporation's security policy. Security policies may restrict file and databases access, or may limit or prohibit access to any corporate resource, for computers having unlimited Internet access. For example, only certain users, or computers, may be allowed to establish external network connections and communicate with the outside world; however, these computers may be precluded from accessing databases that store client data. This is done to protect corporate resources and computers from the viruses and other threats that exist. Other security policies may require verification and compliance with corporate security checks prior to logging on to the internal network.

This form of internal isolation is typically adequate where no remote users are allowed to connect to the internal corporate network. However, there is a fundamental problem with allowing remote users access to internal corporate resources while enforcing the requirements of the corporate security policy. This is evident in that a remote computer typically accesses the Internet with no filter, or simply a firewall, in place. In this situation, when a remote computer connects to a corporate server through a VPN connection, the corporation cannot enforce its internal security policy on the client computer. Thus, the remote computer is able to access critical data, i.e., it appears to be directly connected to the internal network, without meeting the same internal security requirements, and without being buffered from external threats. This is a concern for corporate security in that compromised remote computers would gain unrestricted access to the corporate network.

This danger may be mitigated if the remote computer was properly protected and not compromised while using the VPN. However, since the remote computer is not under direct control of corporation, this cannot be ensured with current client-driven security methods.

Various attempts have been implemented to address these issues, however, none fully provide strict adherence to the corporate security policy. Most solutions rely on client computer security policies, or client implemented enforcement of a security policy, before allowing VPN access. For example, many VPN client programs check for the presence of a virus scanner and, possibly, a personal firewall on the remote client's machine. This information may be useful to the server, but it does not ensure that a client computer is not compromised. Moreover, certain viruses may circumvent virus checkers and firewalls, or a remote computer may become compromised during an active VPN session.

Other security checks may be run on the client computer, such as verifying up to date virus definitions, or ensuring that security programs, such as BlackICE™ family of products, are present. However, these solutions still rely on client-initiated verification, and the client verified information is presented to the server. In the event that the client computer is compromised, inaccurate information may be passed to the server.

Therefore, there remains a need for systems and methods for verifying the configuration state of a remote computer before allowing the remote computer to access the internal network.

SUMMARY OF THE INVENTION

The embodiments of the present invention provide a method to ensure that a remote computer making a VPN connection is properly protected. Accordingly, one embodiment, a server-driven security check is required of the remote machine before allowing any VPN connection. These server-driven checks are preferably adaptable and configurable to provide secure VPN connections. The server-driven security checks may be configured with what to verify and how the verification should be accomplished. A server may first be configured with any number of remote user access levels. The server-driven security checks may then be configured to verify compliance with each access level before access will be granted at that level, i.e., checks for limited access to the server are typically less stringent than checks for unlimited access to the server. In this way, both client and server resources can be used efficiently to grant the required level of access. Additionally, the security checks may require iterative access level verification, rather than verification for all levels at once. Further, the security checks may be configured such that each communication with the client is treated independently, and cumulative information is included in each server-client communication cycle.

In another embodiment, the security checks adapt to information received from the remote computer to determine if additional information is required before VPN access is allowed. For example, where a client transmits information that a particular program or process is active, the security check may adaptively require that the client transmit associated registry entries or .dll files in use by the program or process. When the server is satisfied that the particular program or process is secure, the server may then adaptively verify any other programs, processes, etc., in place on the client computer.

Based on the configured security checks, and the adaptive security analysis, VPN access is granted to a remote computer. In one embodiment, a token is provided by a server to a client computer. The client computer may pass this token to the VPN client program, or VPN application, for use when logging on to the VPN server. The server may require that the token be updated at certain time intervals, e.g., 10 seconds, 1 minute, and 1 hour, to ensure that the remote computer continues to comply with the corporate security policy. Moreover, the token may contain information regarding the level of access to grant the remote computer based on the analysis of the server-driven security checks.

The benefits of such server-driven verification include easily configurable user and group security profiles without the need to update client computers. Further, one of a plurality of access levels may be granted based on conformance tests. Additionally, conformance tests may be added or modified to allow timely response to newly discovered vulnerabilities, and passwords may be changed at any interval to prevent replay attacks.

One embodiment of the present invention is directed to a method of allowing a remote computer access to an internal network comprising: receiving an access request from the remote computer; requesting and receiving information representing a configuration state of the remote computer, the requested information based at least on the access request received from the remote computer; determining remote computer compliance with a security policy based at least on the information received from the remote computer; requesting and receiving additional information if the remote computer is not in compliance with the security policy, the additional information request based at least on the received information and the security policy; and allowing the remote computer access to the internal network if the remote computer is in compliance with the security policy.

Another embodiment of the present invention is directed to a method for providing access to a server computer, comprising: receiving an initial token request; evaluating the initial token request for compliance with a configurable security policy; if the initial token request does not comply with the configurable security policy, transmitting a configurable token data request, receiving, in response to the configurable token data request, another token request, evaluating the received another token request for compliance with the configurable security policy, and repeating the transmitting, receiving and evaluating steps until the received another token request complies with the configurable security policy; transmitting a token; and processing a server login request comprising said token.

Another embodiment of the present invention is directed to a method for providing access to a server computer from a remote computer, the server having a plurality of access levels, each level comprising a user profile corresponding to an access level, the method comprising: (a) receiving a token request; (b) evaluating the token request for compliance with at least one of the plurality of access levels; (c) if the token request does not comply with at least one of the plurality of access levels, (i) transmitting at least one security data request based at least on the received token request, (ii) receiving a response to the at least one security data request, and (iii) evaluating the received response for compliance with at least one of the plurality of access levels; (d) repeating step (c) until the received response complies with at least one of the plurality of access levels; (e) transmitting a token corresponding to the at least one compliant access level, wherein said token is used for accessing the server computer; and (f) providing access to the server according to the user profile contained in the token.

Another embodiment of the present invention is directed to a method of allowing a remote computer access to an internal network comprising: receiving an access request from the remote computer; transmitting to the remote computer a program for execution by the remote computer; receiving data generated by the program; verifying remote computer compliance with a security policy of the internal network based on the received data; allowing the remote computer access to the internal network if it is in compliance with the security policy.

Another embodiment of the present invention is directed to a method of accessing a secured internal network from a remote computer comprising: (a) transmitting an access request to a token server; (b) receiving a data request from the token server; (c) transmitting the requested data to the token server; (d) repeating steps (b)-(c) until a token is received from the token server; and (e) transmitting the received token to a bridge server connected to the internal network to access the internal network.

Another embodiment of the present invention is directed to a computer-readable medium comprising instructions for controlling a computer to allow access to an internal network by a remote computer over an external network by: receiving an access request from the remote computer; sending at least one data request to the remote computer, the data request based at least on the access request; receiving a response to the data request from the remote computer; verifying that the remote computer complies with a security policy of the internal network based on the response received from the remote computer; sending an additional data request to the remote computer if the received response does not comply with the security policy, the additional data requested based at least on the received response and the security policy; and allowing the remote computer access to the internal network if the remote computer is in compliance with the security policy of the internal network.

Another embodiment of the present invention is directed to a secured network comprising: an internal communication network; a token server connected to an external communication network, the token server adapted to receive a request to connect to the internal communication network from a remote computer over the external communication network and further adapted to transmit a token to the remote computer after verifying that the remote computer complies with at least one of a plurality of security policies; and a bridge server connected to the internal communication network and the external communication network, the bridge server adapted to allow access to the internal communication network when presented with a token.

BRIEF DESCRIPTION OF THE DRAWINGS

FIG. 6 is a list of configuration information that may be used in some embodiments of the present invention; and FIG. 7 is a exemplar screenshot of a client-server communication cycle in an embodiment of the present system and method; and

DETAILED DESCRIPTION OF THE PREFERRED EMBODIMENTS

Figure 1:
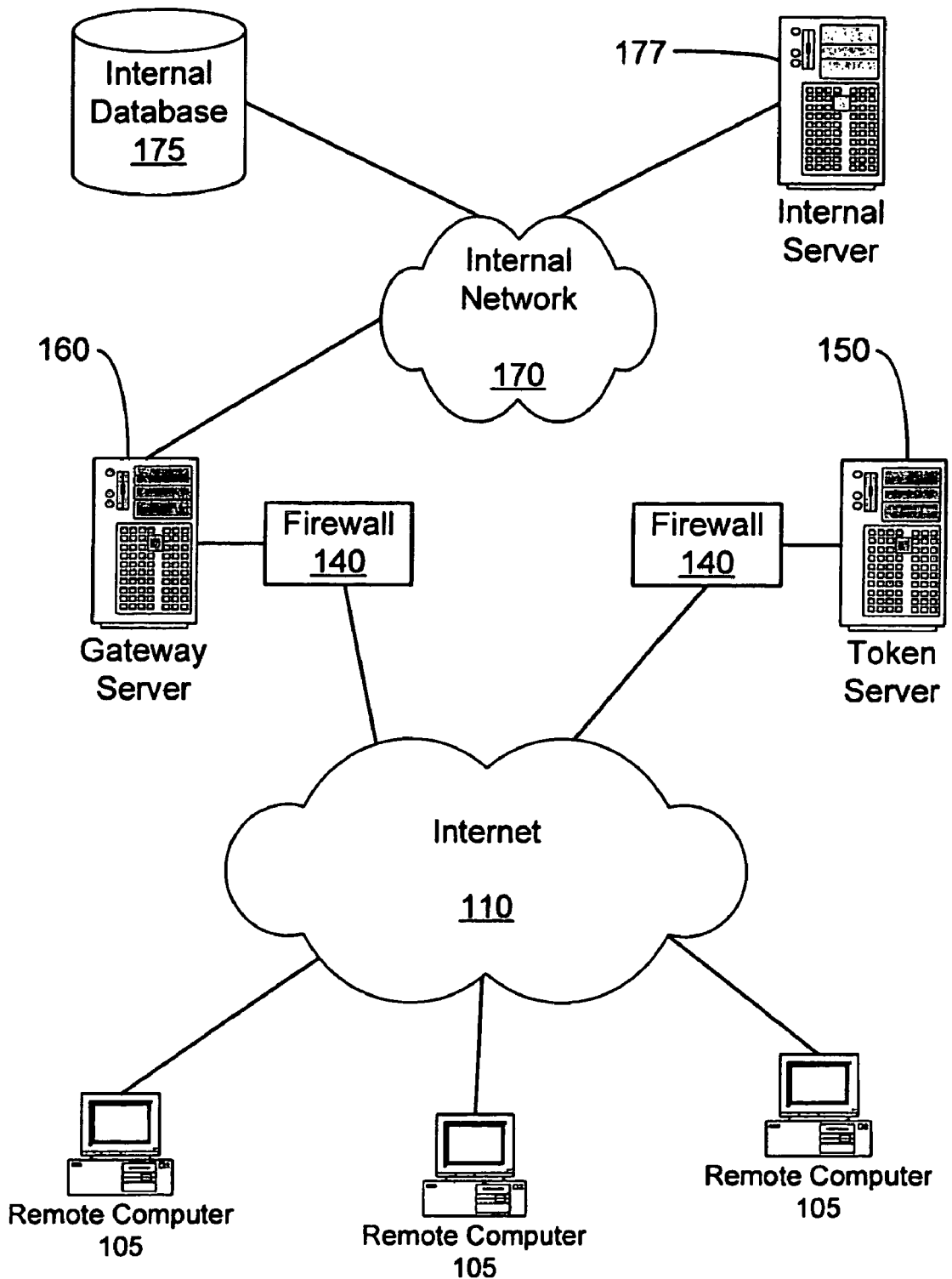
FIG. 1 is a block diagram illustrating one preferred embodiment of the present system and method.

FIG. 1 illustrates one preferred embodiment of the present system and method. FIG. 1 shows a remote computer 105 connected to an external network 110, such as, for example, the internet. The remote computer 105 may connect to any other computer or network connected to the internet.

In FIG. 1, an internal network 170 is shown connected to internal network resources such as, for example, an internal database 175 and an internal server 177. As will be recognized by those skilled in the art, many servers may be connected to the internal network 170, including failover and load balancing servers. Further, any suitable network connection may be implemented in place of Internet 170, although connection using HTTP or HTTPS is preferred. Additionally, other corporate resources may be accessible through servers although these resources are not illustrated in FIG. 1. Examples of corporate resources may be, but are not limited to, printers, e-mail servers, applications servers, proxy servers, and scanners.

The internal network 170 is connected, or bridged, to the external network 110 through a firewall 140 and a bridge server 160. Both the firewall 140 and bridge server 160 restrict access to the internal network 170 from unauthorized remote computers on the external network 110. Access to the internal network 170 may be allowed when the remote computer 105 presents a token containing the appropriate authorizations to the bridge server 160.

The remote computer 105 receives the token from a token server 150. The token server 150 connects to the external network 110 through a firewall 140. Unlike the bridge server 160, the token server 150 may not be connected to the internal network 170. Isolating the token server 150 from the internal network 170 provides an additional level of protection to the internal network 170 because any remote computer 105 attempting to gain access to the internal network 170 remains isolated from the internal network 170 until the token server 150 confirms that the remote computer 105 conforms to the security policy corresponding to the requested access level.

In other embodiments, the bridge server 160 provides the remote computer security policy confirmation functions of the token server and token transmission to the remote computer. Combining the verification functions of the token server 150 and the gate-keeper functions of the bridge server 160 into a single computer has the advantage of reducing hardware costs.

Also shown in FIG. 1 are internal corporate network(s) (170) and corporate database(s) (175) connected to servers 102. As will be recognized by those skilled in the art, many servers may be present, including failover and load balancing servers. Further, any suitable network connection may be implemented in place of Internet 110, although connection using HTTP or HTTPS is preferred. Additionally, other corporate resources may be accessible through servers 102 although these resources are not illustrated in FIG. 1. Examples of corporate resources may be, but are not limited to, printers, e-mail servers, applications servers, proxy servers, and scanners.

Figure 2:
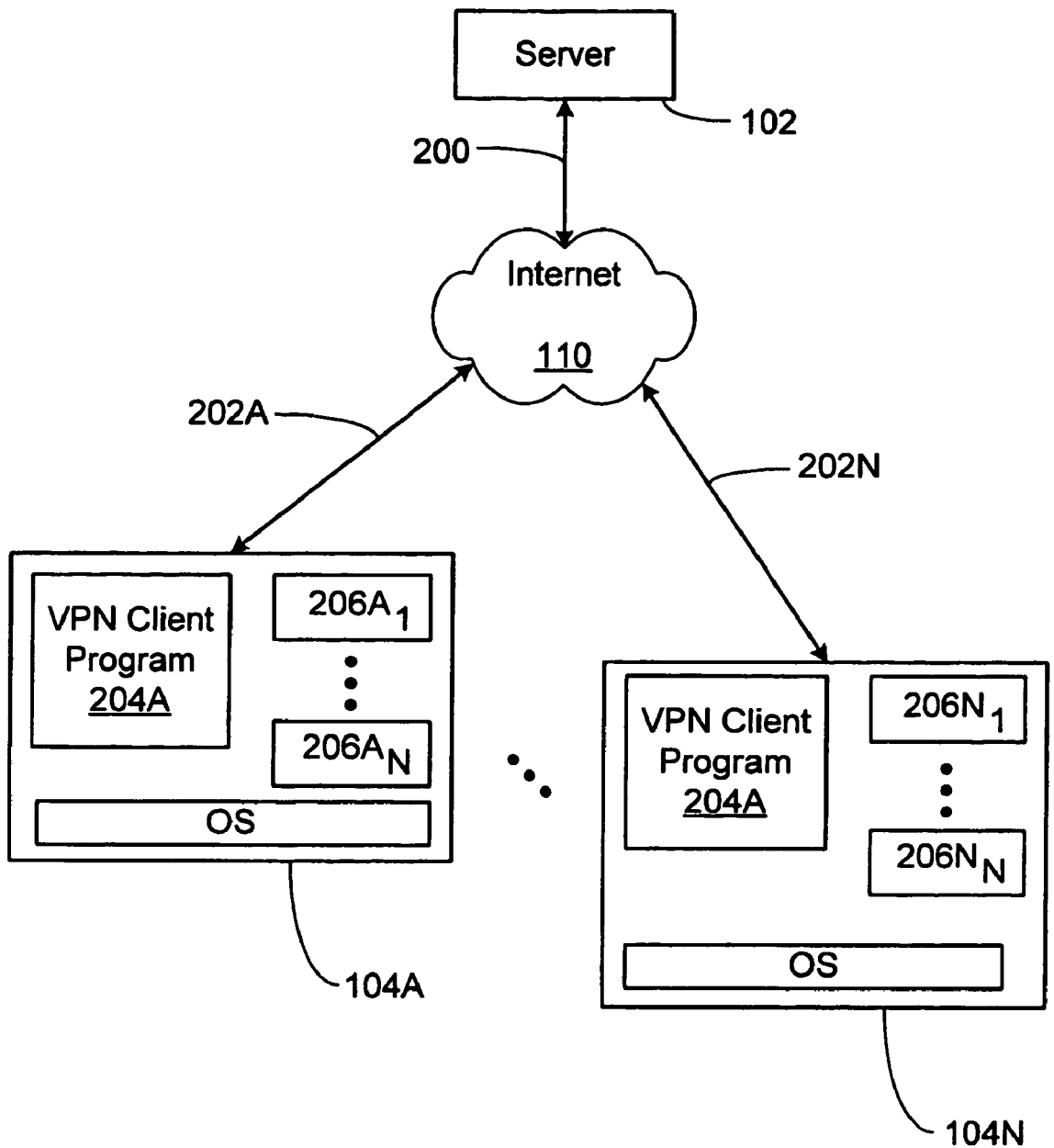
FIG. 2 is a block diagram illustrating aspects of the preferred embodiment of FIG. 1 in more detail.

FIG. 2 illustrates aspects of the present system and method in detail. Components 102, 104, and 110 correspond to identical components shown in FIG. 1. A server 102 is preferably connected to the internet via connection 200. As described above, any suitable network connection may be implemented to facilitate communication between servers and clients.

Further shown in FIG. 2, are clients 104. Each client, or remote computer, has an operating system running, as well as a plurality of applications 206. The operating system may include a registry that contains configuration information of the operating system and the applications. These applications may be document processing applications, Internet browsers, audio or video applications, e-mail programs, anti-virus programs, games, or other applications a user may elect to install. Each client preferably comprises a VPN client application 204. The VPN client application facilitates communication between the remote computer and the server, and once a VPN connection is established, provides a user with the ability to access corporate network resources. The VPN client application is preferably adapted to perform security checks required by server 102. As will be recognized, other secondary applications (206) may be utilized to make the VPN connection, such as Cisco VPN Client®The VPN client program, or the secondary VPN application, may be configured with a list of available servers and a list of available VPN gateway locations (New York, London, Tokyo, etc., for example).

As described in detail below, servers 102 may be configured with user groups, or profiles, allowing varying levels of access to corporate resources. As described in detail below, a profile defines a web group by the various access levels and corporate resource restrictions, as well as the group name and group passwords required to connect to the VPN at a particular access level. As will be recognized, lower access levels granted to a client computer typically pose less danger to the corporate network.

In one embodiment, the remote computer requests a particular profile from server 102. The server preferably assigns the requested profile to the client after the client is verified to comply with the corporate security policy corresponding to that profile. In another embodiment, the server assigns the client a profile based on the client's actual level of security policy compliance. In yet another embodiment, the server may assign the client a default profile as established by the configured security policy.

Each user group may also be password protected. Accordingly, a client may be required to provide a password before the server will assign the remote computer to the requested group. Group passwords may be periodically changed, and profiles updated, to prevent users from capturing the profile and using it to connect to the server (replay), thereby bypassing security checks in place. Since passwords may be changed programmatically, a corporation may update group passwords at any interval such as, for example, 10 seconds, 1 minute, or 1 hour, thereby reducing the effectiveness of a replay attack.

In one embodiment, server 102 may require a token with a login request. This token preferably comprises a server assigned profile. These login tokens are preferably passed from the server to the client after the server determines that the client complies with a particular access level. In another embodiment, the profile itself is transmitted to the client, and is used in the login process. As will be recognized, the server may require other data for a remote computer login, such as a username and password, security ID number, or other user security validation information as known in the art. Moreover, the server may require that the profile or token be included in the login request, and may also revalidate security policy compliance, group password, client profiles assignment, etc., at any time.

Figure 3:
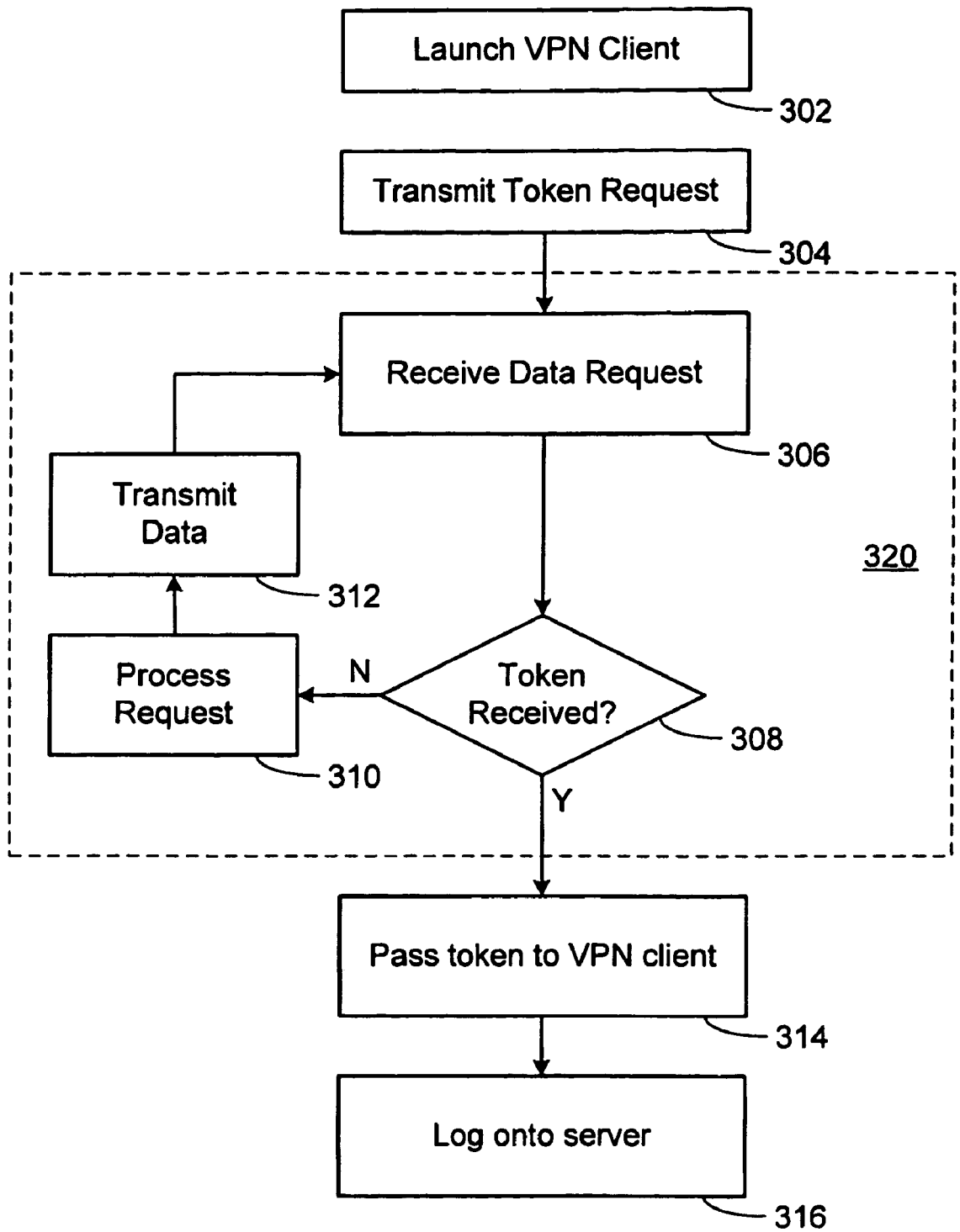
FIG. 3 is a flow diagram illustrating aspects of system operation in one preferred embodiment of the present system and method.

FIG. 3 is a flow diagram illustrating a preferred embodiment illustrating system operation for a remote computer logon. In a preferred embodiment, a computer executing a program stored on a computer-readable medium maintains the system operation. As shown in FIG. 3, at step 302, an instance of VPN client 204 is started on the remote computer. In one embodiment, the VPN client may attempt to login to a server 102 and operation would flow directly to step 306. However, as described above, server 102 may require the remote computer to submit a token with a login request. Accordingly, in a preferred embodiment, the VPN client requests a token from server 102 (step 304). Additionally, in other embodiments, the remote computer requests a particular VPN bridge server, a particular profile server, or a particular VPN entry point with its token request. Typically, profile related information is preconfigured for each user, but these parameters can be altered, for example, when the user travels.

After the VPN client requests a token, or attempts to login to the server, the remote computer receives data from the server in step 306. In step 308, the VPN client application determines if a token (or profile) is present in the received data. If a token (or profile) is present, operation proceeds to step 314. If no token (or profile) is present, the client application processes the data received from the server.

In one embodiment, the data comprises a request for the client to collect data related to a requested, or assigned, user group. The data request may be formatted in XML, HTML, or other suitable formatting method. The data request may require the remote computer to collect security or other information, and may contain actions that the remote computer should or must perform. In one embodiment, no executable actions are included in the data request. In other embodiments, the server may provide a program to be run on the remote computer. The program may be, for example, an application, script, or link to a networked program. In some embodiments, the program may reside on the remote computer. In some embodiments, the program provided by the server may be executed automatically on the remote computer without direct user intervention.

The data collection requested by the server may include, but is not limited to: a check if a registry key exists (get properties of that key); a list sub-keys of a registry key; a list of values in a registry key; a value in a registry key; attributes of a disk directory; a list files in a directory; returning attributes of a disk file; contents of a disk file (hard-coded size limit); a listing of services installed on the remote machine (includes current status); details of a particular service or process; a list of processes running or applications available on the target machine; a list of the current user's environment variables; general machine and operating system information (version, build service pack); and general client program (VPNConnect) information.

Actions for the client to perform may include, but are not limited to, displaying a message to the user and optionally, if requested by the user, opening a web URL. If the URL is not http, https, or ftp, the client may display an extra warning that this URL may not be safe to open. Typically, the URL is intended as a way to point the user to a web page that describes in more details conditions that must be satisfied by the client computer before it will be allowed to access the network; and run an anti-virus definition update.

The VPN client application processes the request(s), and after the data is processed and collected, the data is transmitted to the server in step 312. Steps 306-312 are repeated, Indicated by dashed box 320, until the token or profile is received. In step 314, the token or profile is passed to the VPN client, and the client logs on to the server in step 316.

Figure 4:
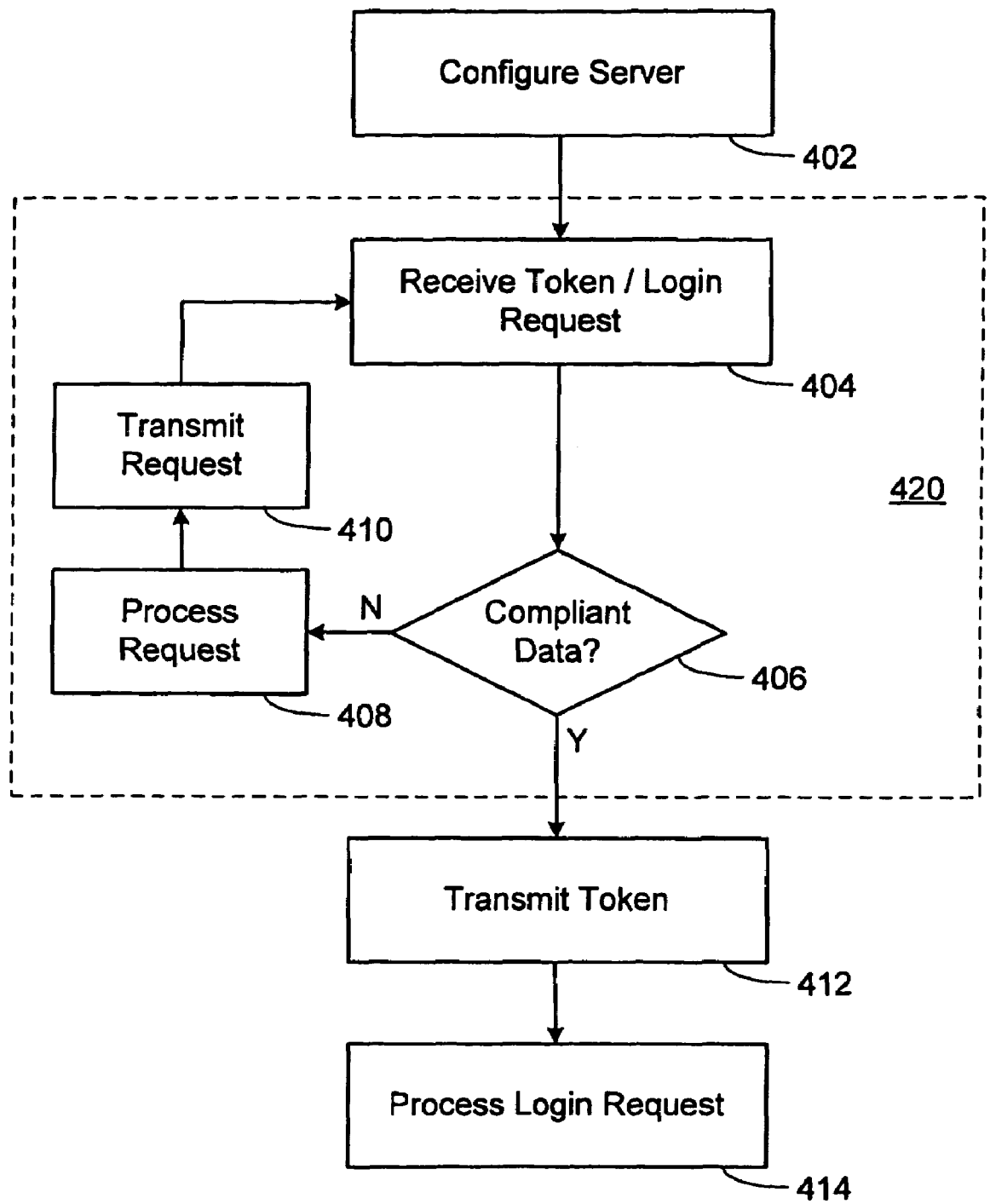
FIG. 4 is a flow diagram illustrating aspects of system operation in another preferred embodiment of the present system and method.
Figure 5:
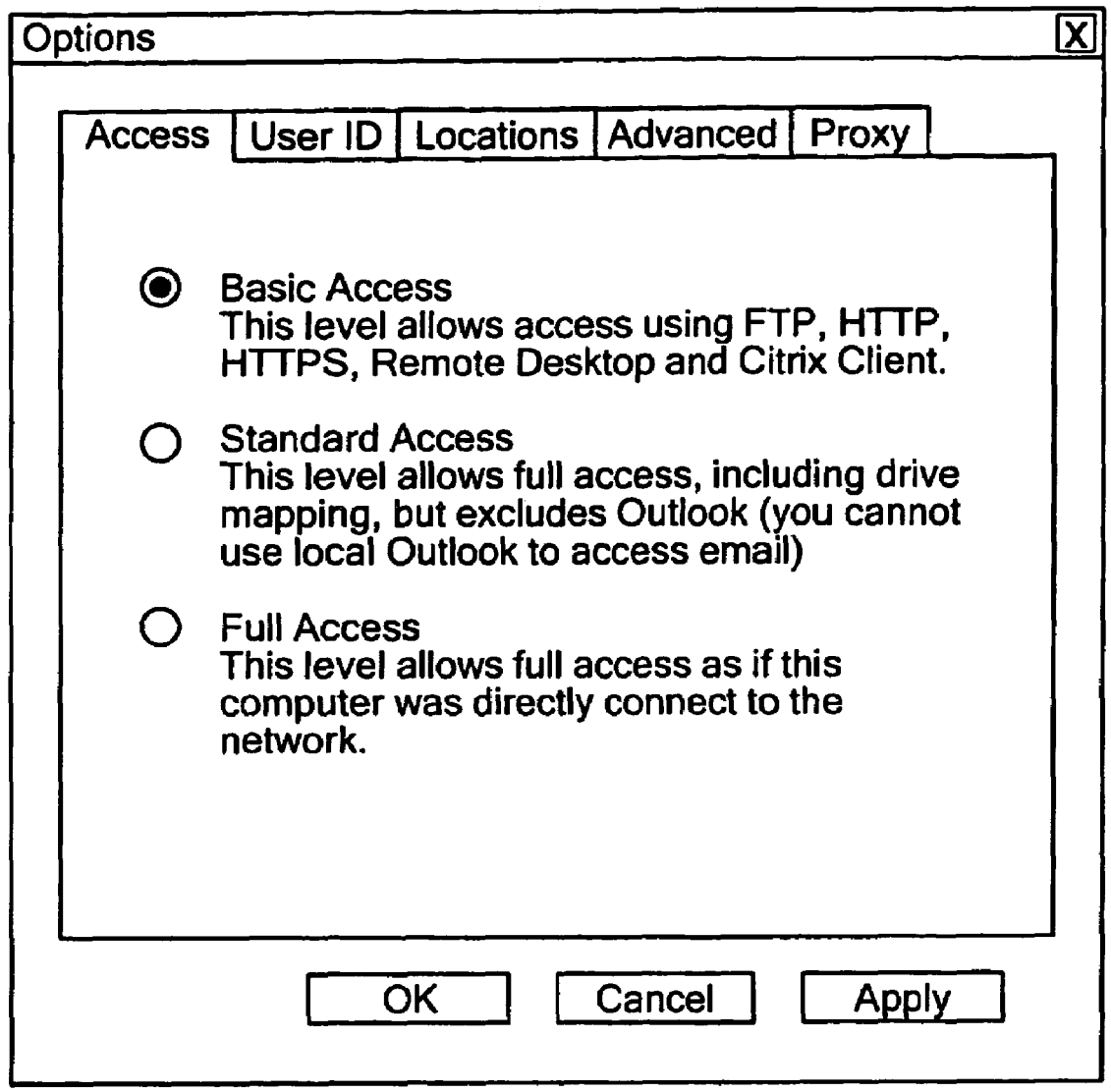
FIG. 5 is an exemplar screenshot of user level access selection in an embodiment of the present system and method.

FIG. 4 is a flow diagram illustrating a preferred embodiment illustrating system operation for server login processing. As shown in FIG. 4, at step 402, the server is configured for VPN access. In one embodiment, the server is configured with defined user groups or profiles having different access levels. These access levels may include, but are not limited to, full access, intermediate access, minimal access, and no access, which may be further defined to be the default access level. The configuration of each access level or group may be altered at any time on the server, and in this way, corporate security policy may adapt to new threats as they arise. Profiles may include, but are not limited to, group access level, resource access level, gateway access based on profile, IP address for VPN server, age of the profile or token, and specific access restrictions. FIG. 5 shows an exemplar screenshot of user level access selection in an embodiment of the present invention.

Each server 102 is also configured with one or more security control files (security checks) that define tests to be performed for a particular access level and access level restrictions that may apply should any security test fail. As will be recognized, it is not necessary for a test failure to result in a denial of access, rather, the security policy in place may simply restrict access to the next lower level, i.e., from intermediate access to low level access. By way of example only, control files may also contain any of the following: list of files resulting in denial; list of registry entries, keys or values resulting in denial; required files for access at a particular level; required registry entries, keys, or values for access at a particular level; required product versions for access at a particular level; require Service State for access at a particular level; and messages for display on the remote computer.

Additionally, the control files may require that the operating system have up to date patches or security fixes installed. When unknown or undefined programs, processes, registry entries, etc, are located on the remote computer, the security policy may be configured to deny or restrict access to the internal network and concurrently transmit a message to the user Indicating the same. Certain third party applications, registry entries, registry keys, or registry values on the remote computer may be defined to cause the server to deny or restrict access to the internal network. FIG. 6 shows list of such exemplar prohibited configuration information or state that may be used in some embodiments of the present invention to deny or restrict access to the internal network.

As will further be recognized, any number of profiles may exist on, or be accessible to, the server. Each profile may require a different level of security compliance before the server distributes the profile to the remote computer. For example, a profile only allowing full access to applications may have a stricter security requirements than a profile only allowing full access to e-mail servers. Any combination of group access level and corporate resource may be implemented to provide the most adaptable security policy for the corporate network. For example, resources such as printers, e-mail servers, applications, proxy servers, etc., may be defined with any security policy restrictions within each of the desired user groups.

In an alternate embodiment, the token request is transmitted to a separate profile server existing independently (physically or logically) from the VPN bridge server. The profile server preferably contains the profile and related resource security information for every VPN gateway location, i.e., one profile for each access level for each VPN gateway. The profiles may contain information on how the VPN client should connect to VPN servers. This information may include IP addresses or DNS names of VPN servers appropriate for the location, and the group name on those servers corresponding to the access level of the profile and the corresponding password. Tokens are passed from the profile server to the remote computer, and these tokens are used for connection to the VPN bridge server. In this way, VPN server resources are not used for profile assignment and other security related tasks.

In step 404, server 102 receives a token or login request from a remote computer. Server 102 parses the token request and performs tests on the data based on the security control files in step 406. The tests correspond to the security requirements of the internal network and verify that the remote computer is not compromised. For example, the tests may verify registry keys or entries, disk and directory attributes, application attributes, file attributes, services installed, processes running, user environmental variables, remote machine and operating system information, VPN client information, anti-virus program information, or virus definition information of the remote computer. As mentioned above, these tests may be modified or new tests added at any time to address new security threat, or to provide different profiles or access levels. Furthermore, any combination of these tests may be implemented to provide the desired level of security.

If the received data complies with the requested or assigned profile's security policy, the server transmits a token to the client in step 412. If the data does not comply, the server may determine additional information required to determine compliance in step 408. As will be recognized, little or no information may be present with the initial token request. In this situation, the server may determine that all tests should be performed, and accordingly, the server requests corresponding data from the remote computer. The request for additional data is transmitted to the remote computer in step 410.

In step 414, the server processes the login request from the remote computer. During login, the remote computer identifies itself and confirms its identity by, for example, a user ID and user password. The remote computer presents the token to the login server and checks the authorization encoded in the token before establishing a connection such as, for example, a VPN connection.

The server receives follow up information, and processing continues through the steps of 404-410 for a predetermined number of iterations, or until compliant test data is received. The dashed box labeled 420, in FIG. 4, illustrates the iterative process of receiving data at the server, evaluating the data, processing the data for new information requests, and transmitting the data request.

In one embodiment, the server retains the state of the negotiation with the remote computer. In this way, each request is treated as a standalone set of data. If test data is incomplete, the entire list of required data is sent back to the client. In another embodiment, only the additional test data required is requested from the remote computer. In a preferred embodiment, it may be necessary for the remote computer to extend the request two or three times before the request contains all information required by the server.

In another embodiment, the server may not know what information it will need from a particular remote computer until after it has received the initial token request from the remote computer. The server parses the token request and identifies the security tests that should be performed in order to grant a particular profile to the client. The server transmits the identified data requests to the remote computer and receives the data corresponding to the required tests from the remote computer. The server parses the data, and determines whether the data is sufficient to grant the profile. With respect to this follow-up data, the server determines if additional information is required. For example, the server may not know to request the path for a file until it receives a registry or disk entry indicating that a file exists, or, the server may not know to verify .dll file integrity or macro integrity until it receives related process or application data.

The server evaluates the follow-up request to determine if additional tests should be run. If so, the server transmits additional data requests by repeating the above steps 420. After all adaptive evaluations have been performed, the server may grant a particular profile. However, if all defined tests have been performed and the server determines that security may still be compromised, a lower level of access on a lower profile level, or no access, may be granted. For example, a corporation may not have testing parameters for a particular process, thus the server cannot evaluate the process, and accordingly, the server restricts access to corporate resources. FIG. 7 is a exemplar screenshot of a client-server communication cycle in an embodiment of the present invention illustrating the repeated exchanges of information between the remote computer and the server prior to the establishment of a connection between the remote computer and the server.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method of accessing an internal network from a remote computer, comprising:
   (a) transmitting an access request to a token server, the token server configured to determine compliance with a security policy, wherein the token server is not connected to the internal network;
   (b) receiving from the token server a request for configuration information representing a configuration state of the remote computer;
   (c) transmitting the configuration information of the remote computer to the token server;
   (d) performing one or more remedial actions if the remote computer is not in compliance with the security policy, the one or more remedial actions determined based on the configuration information;
   (e) transmitting updated configuration information to the token server after the one or more remedial actions are performed;
   (f) receiving an access token from the token server if the remote computer is in compliance with the security policy, wherein the compliance with the security policy is verified based on the updated configuration information; and
   (g) transmitting the access token to a bridge server connected to the internal network to access the internal network.

2. The method of claim 1, wherein the access request includes a requested access level, the requested access level selected from a plurality of access levels maintained by the internal network, each of the plurality of access levels authorizing a level of access to a network resource.

3. The method of claim 2, wherein the received access token includes a granted access level.

4. The method of claim 3, wherein the requested access level is the same as the granted access level.

5. The method of claim 1, wherein the access request includes a requested user profile, the user profile corresponding to a requested access level of a server on the internal network.

6. The method of claim 5, wherein the token server determines compliance of the remote computer with a security policy by evaluating the access request for compliance with at least one of a plurality of access levels of the server on the internal network, the at least one of the plurality of access levels being based, in part, on the requested user profile of the remote computer.

7. The method of claim 5, wherein the received access token includes a granted user profile.

8. The method of claim 7, wherein the requested user profile is the same as the granted user profile.

9. The method of claim 1, wherein the access token expires after a predetermined period of time.

10. The method of claim 1, further comprising executing a program stored on the remote computer.

11. The method of claim 10, further comprising automatically executing the program.

12. The method of claim 1, further comprising accessing a web page having updates and executing the updates.

13. The method of claim 1, further comprising executing an anti-virus update on the remote computer.

14. A system, comprising:
a remote computer in communication with a token server via an external network to obtain an access token to access an internal network by transmitting the access token to a bridge server connected to the internal network and the external network, wherein the token server is not connected to the internal network,
the remote computer configured to transmit to the token server an access request and configuration information representing a configuration state of the remote computer, the configuration information based at least on the access request,
the remote computer further configured to:
perform one or more remedial actions if the remote computer is not in compliance with a security policy, the one or more remedial actions determined based on the configuration information,
transmit updated configuration information to the token server after the one or more remedial actions are performed,
receive an access token from the token server if the remote computer is in compliance with the security policy, wherein the compliance with the security policy is verified based on the updated configuration information, and
transmit the access token to the bridge server to access the internal network.

15. The system of claim 14, wherein the access request includes a requested access level, the requested access level selected from a plurality of access levels maintained by the internal network, each of the plurality of access levels authorizing a level of access to a network resource.

16. The system of claim 15, wherein the received access token includes a granted access level.

17. The system of claim 16, wherein the requested access level is the same as the granted access level.

18. The system of claim 14, wherein the access request includes a requested user profile, the user profile corresponding to a requested access level of a server on the internal network.

19. The system of claim 18, wherein the token server is configured to determine compliance of the remote computer with a security policy by evaluating the access request for compliance with at least one of a plurality of access level of the server on the internal network, the at least one of the plurality of access levels being based, in part, on the requested user profile of the remote computer.

20. The system of claim 18, wherein the received access token includes a granted user profile.

21. The system of claim 20, wherein the requested user profile is the same as the granted user profile.

22. The system of claim 14, wherein the access token expires after a predetermined period of time.

23. The system of claim 14, wherein the remote computer is further configured to execute a program stored on the remote computer.

24. The system of claim 23, wherein the remote computer is further configured to automatically execute the program.

25. The system of claim 14, wherein the remote computer is further configured to access a web page having updates and execute the updates.

26. The system of claim 14, wherein the remote computer is further configured to execute an anti-virus update on the remote computer.

27. A computer program product including a computer readable medium having stored thereon computer executable instructions that, when executed on a computer, configure a remote computer to perform a method of accessing an internal network comprising the steps of:
(a) transmitting an access request to a token server, the token server configured to determine compliance with a security policy, wherein the token server is not connected to the internal network;
(b) receiving from the token server a request for configuration information representing a configuration state of the remote computer;
(c) transmitting the configuration information of the remote computer to the token server;
(d) performing one or more remedial actions if the remote computer is not in compliance with the security policy, the one or more remedial actions determined based on the configuration information;
(e) transmitting updated configuration information to the token server after the one or more remedial actions are performed;
(f) receiving an access token from the token server if the remote computer is in compliance with the security policy, wherein the compliance with the security policy is verified based on the updated configuration information; and
(g) transmitting the access token to a bridge server connected to the internal network to access the internal network.

28. The computer program product of claim 27, wherein the access request includes a requested access level, the requested access level selected from a plurality of access levels maintained by the internal network, each of the plurality of access levels authorizing a level of access to a network resource.

29. The computer program product of claim 28, wherein the received access token includes a granted access level.

30. The computer program product of claim 29, wherein the requested access level is the same as the granted access level.

31. The computer program product of claim 27, wherein the access request includes a requested user profile, the user profile corresponding to a requested access level of a server on the internal network.

32. The computer program product of claim 31, wherein the received access token includes a granted user profile.

33. The computer program product of claim 32, wherein the requested user profile is the same as the granted user profile.

34. The computer program product of claim 27, wherein the access token expires after a predetermined period of time.

35. The computer program product of claim 27, further including computer executable instructions that, when executed on the computer, configure the remote computer to perform the step of executing a program stored on the remote computer.

36. The computer program product of claim 35, further including computer executable instructions that, when executed on the computer, configure the remote computer to perform the step of automatically executing the program.

37. The computer program product of claim 27, further including computer executable instructions that, when executed on the computer, configure the remote computer to perform the steps of accessing a web page having updates and executing the updates.

38. The computer program product of claim 27, further including computer executable instructions that, when executed on the computer, configure the remote computer to perform the step of executing an anti-virus update.

39. A method of allowing a remote computer access to an internal network, comprising:
receiving an access request from the remote computer;
receiving configuration information representing a configuration state of the remote computer, the configuration information based at least on the access request;
determining remote computer compliance with a security policy based at least on the information received from the remote computer;
initiating one or more remedial actions on the remote computer if the remote computer is not in compliance with the security policy, the one or more remedial actions determined based on the configuration information;
receiving updated configuration information from the remote computer after the one or more remedial actions are performed;
verifying remote computer compliance with the security policy based on the received updated configuration information; and
transmitting an access token to the remote computer to allow the remote computer to access the internal network if the remote computer is in compliance with the security policy.

40. A system, comprising:
a token server in communication with a remote computer via an external network to allow the remote computer access to an internal network, the remote computer gaining access by transmitting an access token to a bridge server connected to the internal network and external network, wherein the token server is not connected to the internal network,
the token server configured to receive from the remote computer an access request to connect to the internal network and configuration information representing a configuration state of the remote computer, the configuration information based at least on the access request, the token server further configured to:
determine remote computer compliance with a security policy based at least on the information received from the remote computer,
initiate one or more remedial actions on the remote computer if the remote computer is not in compliance with the security policy, the one or more remedial actions determined based on the configuration information,
receive updated configuration information from the remote computer after the one or more remedial actions are performed,
verify remote computer compliance with the security policy based on the received updated configuration information, and
transmit an access token to the remote computer to allow the remote computer to access the internal network if the remote computer is in compliance with the security policy.

41. A computer program product including a computer readable medium having stored thereon computer executable instructions that, when executed on a computer, configure a computer to perform a method of allowing access to an internal network by a remote computer comprising the steps of:
receiving an access request from the remote computer;
receiving configuration information representing a configuration state of the remote computer, the configuration information based at least on the access request;
determining remote computer compliance with a security policy based at least on the information received from the remote computer;
initiating one or more remedial actions on the remote computer if the remote computer is not in compliance with the security policy, the one or more remedial actions determined based on the configuration information;
receiving updated configuration information from the remote computer after the one or more remedial actions are performed;
verifying remote computer compliance with the security policy based on the received updated configuration information; and
transmitting an access token to the remote computer to allow the remote computer to access the internal network if the remote computer is in compliance with the security policy.

* * * * *